June 25, 1963
H. KARSH
3,095,508
ALTERNATING CURRENT POWER CONTROL SYSTEM
Filed Feb. 6, 1959
2 Sheets-Sheet 1
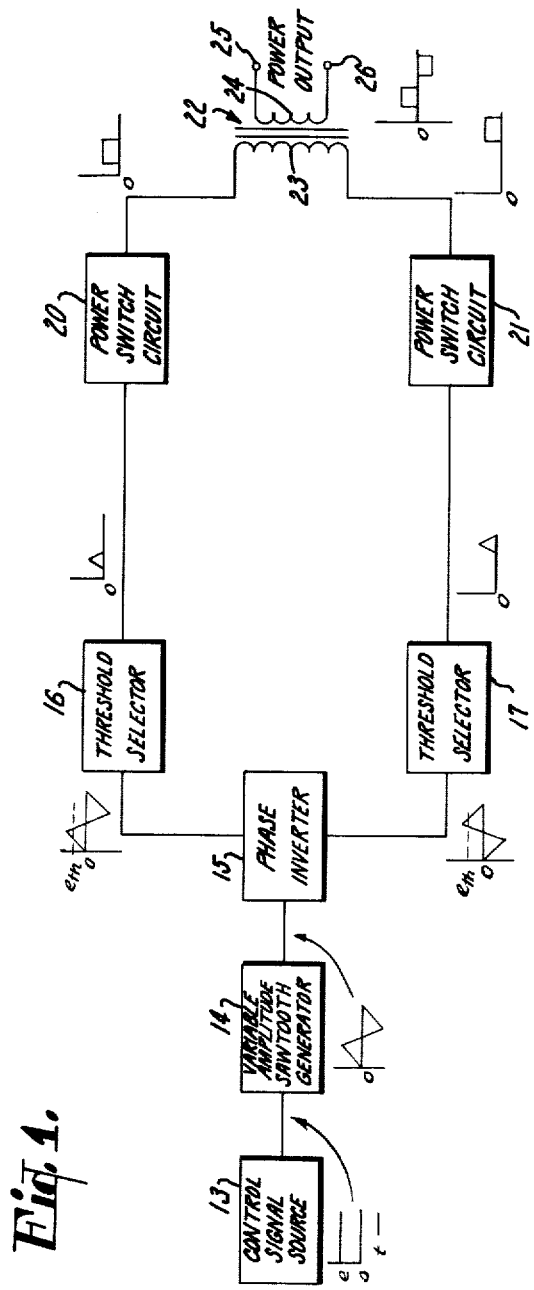
INVENTOR.
HERBERT KARSH
BY
Christie Parker & Hale
ATTORNEYS

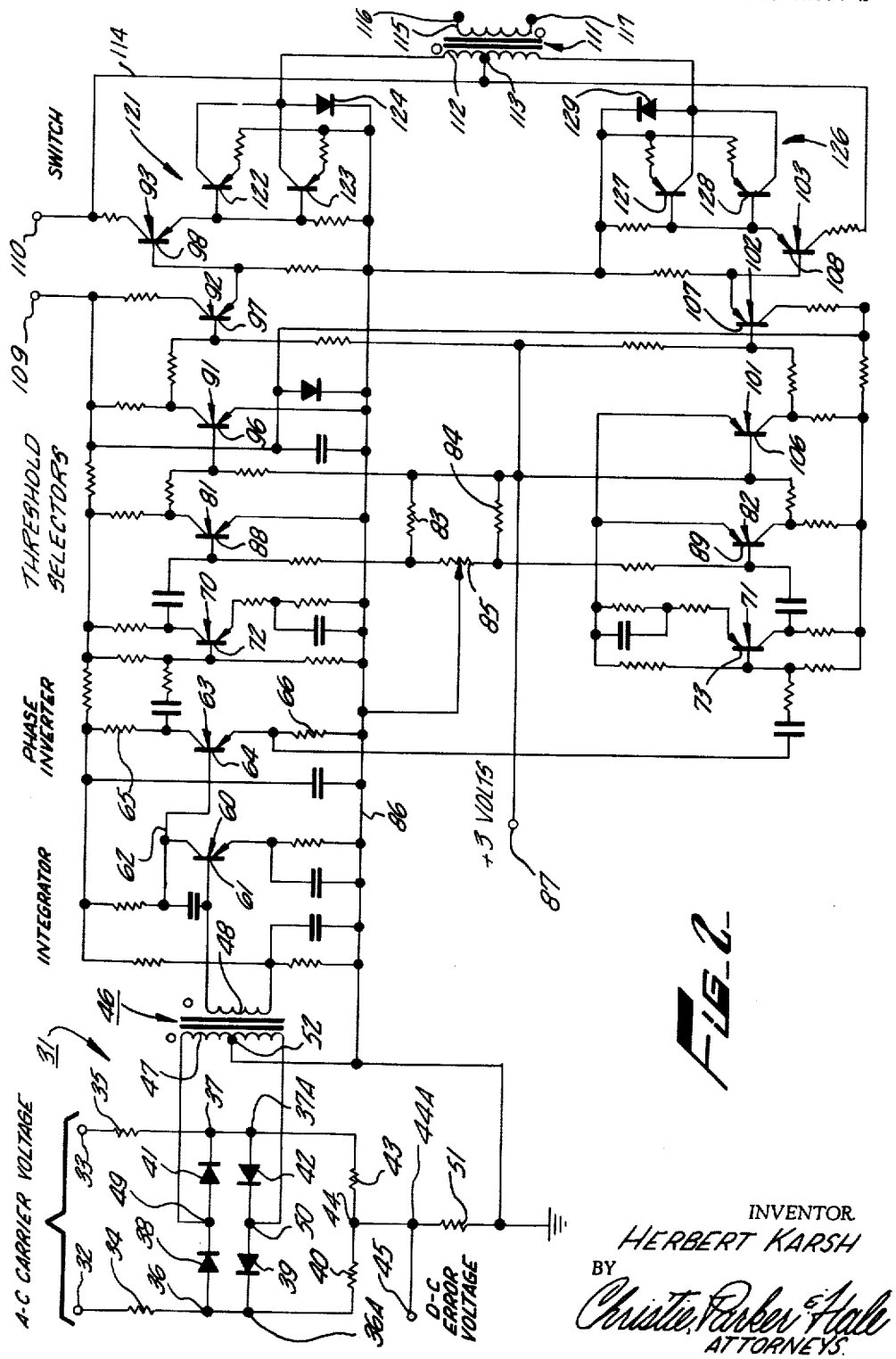

United States Patent Office 3,095,508
Patented June 25, 1963

3,095,508
ALTERNATING CURRENT POWER CONTROL SYSTEM
Herbert Karsh, La Habra, Calif., assignor, by mesne assignments, to Consolidated Electrodynamics Corporation, Pasadena, Calif., a corporation of California
Filed Feb. 6, 1959, Ser. No. 791,575
8 Claims. (Cl. 307—88.5)

This invention relates to the control of large amounts of alternating current power through the use of switches. More particularly, large amounts of power are controlled by transistors acting as switches. The invention may be utilized to control a two phase servomotor.

The use of thyratrons to generate a controlled A.-C. power is well known. In such systems two thyratrons are connected in push-pull to a transformer. The control of thyratron firing is accomplished by the application of an A.-C. potential to the thyratron grids. An A.-C. potential is applied to the anodes to furnish the ionizing potential and the extinguishing potential for the thyratron. The phase difference between A.-C. potential applied to the grid and the A.-C. potential applied to the anode determines the duration of the firing period.

By means of a shift in the relative phase of the voltages applied to the thyratron grids, one thyratron may be made to fire earlier than the other. When the thyratrons do not fire simultaneously the output from one side of the transformer will be greater than the output from the other side of the transformer and output power will result. Depending upon which of the two thyratrons fires first, the phase of this output power may be reversed by 180°. This output power may, for example, be applied to the control field winding of a servomotor to control the direction of rotation fo the motor.

The use of voltage phase differences to control the firing of the thyratrons provides a method through which reasonably accurate timing of thyratron firing can be achieved. However, such systems which rely on phase relationships for control are necessarily complicated and, to a certain extent, unreliable. In the present invention, the control of A.-C. output power is accomplished without the use of phase angle firing of thyratrons. The necessity for precise control of phase relationships is thereby eliminated.

According to the present invention a control signal is applied to a variable width pulse generator. The width of the output pulses from the pulse generator is related to the control characteristic of the control signal. The pulse generator output pulses are applied to a switching circuit. The switching circuit is connected to a source of electrical power and an output circuit so that power results in the output circuit when the switching circuit is closed. The switching circuit is normally open and is closed in response to a pulse generator output pulse for the duration of the pulse. Thus the average power in the output circuit is related to the width of the pulse generator pulses, and, therefore, to the control characteristic of the control signal.

The invention may be more readily understood by reference to the accompanying drawing in which:

FIG. 1 is a block diagram of a power control system according to the invention, and FIG. 2 is a schematic wiring diagram of a servocontrol system according to the invention.

FIG. 1 shows a block diagram of a power control system according to the invention. A control signal from a control signal source 13 is applied to a variable amplitude sawtooth generator 14. The amplitude of the sawtooth output is related to the control characteristic of the control signal. The sawtooth output is applied to a phase inverter 15 to produce two sawtooth waves of opposite phase.

Two threshold circuits 16 and 17 each have one of the phase inverter outputs applied thereto. Each of the threshold circuits 16 and 17 passes only the portion of the sawtooth wave applied thereto which exceeds a selected amplitude in a predetermined polarity. Since the amplitudes of the sawtooth waves are related to the control signal characteristic, the width of the pulses passed by the threshold circuits 16 and 17 is then related to the control signal control characteristic.

The threshold circuit output pulses are applied to two power switch circuits 20 and 21 connected in push-pull by an output transformer 22. The output transformer 22 has a secondary winding 24 with output terminals 25 and 26. The power switch circuits 20 and 21 are normally open and are connected to the output transformer 22 so that power is induced in the output transformer secondary winding 24 when either of the power switch circuits 20 and 21 is closed. The power switch circuits 20 and 21 close in response to the application thereto of the output pulses from the threshold circuits 16 and 17. The duration of the closing of each of the power switch circuits 20 and 21 is related to the width of the output pulses from the threshold circuits 16 and 17. The average power induced in the output transformer secondary winding 24 is then related to the width of the output pulses from the threshold circuits 16 and 17 and, therefore, to the control signal control characteristic.

FIGURE 2 is a schematic wiring diagram of a power controller system for use with a servomotor. A diode ring modulator 31 has two carrier input terminals 32 and 33 across which a twelve volt A.-C. carrier potential is applied. The A.-C. carrier potential is coupled from terminal 32 by a resistor 34 to two junctions 36 and 36A, and from terminal 33 by a resistor 35 to two junctions 37 and 37A. A diode 38 has its anode connected to junction 36 and a diode 39 has its cathode connected to junction 36A. A resistor 40 is also connected to junction 36A. A diode 41 has its cathode connected to junction 37 and a diode 42 has its anode connected to junction 37A, to which is also connected a resistor 43. The resistors 40 and 43 are connected together at a junction 44. A D.-C. error signal input from a servo system resolver (not shown) is applied at a terminal 45, which is directly connected to a junction 44A. An output transformer 46, having a center tap primary winding 47 and a secondary winding 48 is connected to the diodes 38, 39, 41 and 42 through two terminals 49 and 50 of the primary 47. A limiting resistor 51 is connected between the error signal input terminal 45 and a center tap terminal 52 on the primary winding 47. The center tap terminal 52 is connected to the common or ground connection.

In operation, a D.-C. error voltage, which may be either positive or negative in polarity, is applied to the terminal 45. This voltage is coupled through resistor 40 to the junctions 36 and 36A and through resistor 43 to the junctions 37 and 37A. Assuming first that a zero D.-C. error voltage is applied to the terminal 45, the terminals 36, 36A, 37 and 37A will also be of zero potential, the same potential as the center tap 52 of the transformer 46, since the center tap 52 is connected to ground. The application of an A.-C. carrier voltage, across the terminals 32 and 33, such that the terminal 32 is positive with respect to the terminal 33, then makes the junctions 36 and 36A positive with respect to junctions 37 and 37A. Conventional diodes, such as silicon or germanium diodes, usually exhibit a forward voltage drop, of from one-tenth to one volt, depending upon the particular type of diode. By way of example, assume that the diodes used exhibit a forward voltage drop of about four-tenths of a volt. When the junction 36 is then about eight-tenths of a volt positive with respect to the junction 37, diodes 38 and 41 commence conducting, forming essentially a short circuit. The resistors 34 and 35 limit the flow of current through the diodes 38 and 41, across which a constant voltage drop of about eight-tenths of a volt exists. Since the D.-C. error voltage applied is zero, and the center tap 52 potential is zero, the junction 49 potential is also zero, so that no current flows through the winding 47 regardless of the magnitude of the A.-C. carrier voltage applied. It will be noted that the resistors 40 and 43 are also connected between the junctions 36 and 37, so that a parallel circuit is formed by these resistors and the diodes 38 and 41, current having commenced to flow through the resistors 40, 43 as soon as the junction 36 became positive with respect to the junction 37.

If, however, a positive D.-C. error voltage is applied to the terminal 45, the terminal 49 will no longer be at zero potential, but rather of a potential equal to the magnitude of the error voltage, and current will flow from the center tap 52 through the winding 47 to the junction 49. Conversely, if a negative error voltage is applied to the terminal 45, the junction 49 will become negative, and current will flow from the junction 49 through the winding 47 to the center tap 52. The direction of current flow through the winding 47 determines the polarity of the output pulse induced in the secondary 48, so that a positive or negative pulse is induced in the secondary 48 as a result of conduction of diodes 38 and 41, the polarity of the pulse depending upon the polarity of the D.-C. error voltage applied to the terminal 45. It will be noted that the diodes 39 and 42 are non-conducting since they are back-biased by the application of a positive potential at the terminal 32 with respect to the terminal 33.

When the A.-C. carrier voltage applies a negative potential to the terminal 32 with respect to the terminal 33, the diodes 39 and 42 become conducting in the same manner described heretofore with respect to diodes 38 and 41, and diodes 38 and 41 are non-conducting due to being back-biased. With the application of a D.-C. error voltage to terminal 45, current will flow between the center tap 52 and the terminal 50 in a direction determined by the polarity of the D.-C. error voltage, as previously described with respect to current flow between center tap 52 and the terminal 49. It should be noted that, for a given polarity of D.-C. error voltage, the polarity of pulse induced in the secondary 48 due to current flow between the center tap 52 and the terminal 50, is opposite the polarity of pulse induced in the secondary 48 for current flow between the center tap 52 and the terminal 49. Thus, it is seen that the phase of the A.-C. signal induced in the secondary 48 is determined by the polarity of the error voltage. Further, since the magnitude of the error voltage applied determines the potential difference causing current flow through the primary 47, the magnitude of the error voltage determines the amplitude of the A.-C. signal induced in the secondary 48. The frequency of the signal induced in the secondary 48 is, of course, the same as the frequency of the A.-C. carrier voltage. For small D.-C. error voltages with respect to the A.-C. carrier voltage, indicated in the example as being twelve volts, the output wave form induced in the secondary 48 will have a shape approaching a square wave configuration, since the potential difference between the terminals 32 and 33 in any half cycle rapidly rises from zero to the potential difference required to initiate conduction through one pair of diodes 38, 41 or 39, 42. Thus, if the forward voltage drop is about eight-tenths of a volt, and a sinusoidal A.-C. carrier voltage of twelve volts is utilized, either one or the other pair of diodes will be conducting about ninety-five percent of the time. Since the voltage drop across the diodes during conduction is substantially constant, the signal induced in the secondary 48 rises rapidly from zero to a maximum value as soon as conduction commences through a diode pair. The induced signal remains at this maximum value until conduction in the diode pair terminates. The induced signal then drops to zero. When the other diode pair subsequently begins conduction, the induced signal is of the same magnitude, but of opposite polarity.

The A.-C. output signal induced in secondary 48 is applied to an integrator 60 consisting of a transistor 61 and associated resistors and capacitors. The function of the integrator 60 is to convert the essentially square wave input to the integrator 60 into a sawtooth wave output.

The output of the integrator 60 is applied by a connecting lead 62 to a phase inverter 63. The phase inverter 63 consists of transistors 64, split load resistors 65 and 66, and associated resistors and capacitors. The A.-C. potentials developed across the two split load resistors 65 and 66 are opposite in phase.

Two voltage amplifiers 70 and 71 consisting of transistors 72 and 73, respectively, and associated circuitry, amplify the two outputs of the phase inverter 63.

Two threshold selectors 81 and 82 are biased by means of a voltage divider network consisting of resistors 83 and 84 and a variable resistor 85. The variable resistor 85 is connected to a common lead 86. The adjustment of the variable resistor 85 serves to balance the conduction of the two threshold selectors 81 and 82. A three-volt positive potential is applied to a terminal 87 to provide the required bias to reject the lower portions of the sawtooth wave forms. The threshold selectors 81 and 82 consist respectively of transistors 88 and 89 and associated circuitry. Each threshold selector output consists of a triangular pulse, both the amplitude and width of which are proportional to the magnitude of the error signal applied at terminal 45.

The output of the threshold selector 81 is applied to the first of three cascaded amplifier stages 91, 92 and 93. The function of these three stages is to shape the threshold selector 81 output into a rectangular wave form of sufficient magnitude to saturate the switch output stage (to be described). The amplifier stage 91 consists of a transistor 96 and associated circuitry. The amplifier stage 92 consists of a transistor 97 and associated circuitry. The amplifier stage 93 consists of a transistor 98 and associated circuitry.

The output of the threshold selector 82 is applied to the first of three cascaded amplifier stages 101, 102 and 103. The function of the amplifier stages 101, 102 and 103 is the same as the function of the amplifier stages 91, 92 and 93. The amplifier stage 101 consists of a transistor 106 and associated circuitry. The amplifier stage 102 consists of transistors 107 and associated circuitry. The amplifier stage 103 consists of a transistor 108 and associated circuitry. A negative potential is applied at a terminal 109 to furnish electrical power for the integrator, phase inverter, threshold selectors, and all except the final pair of amplifier stages. A negative potential of fifteen volts is applied at a terminal 110 to furnish electrical power for amplifier stages 93 and 103 and the switch to be described.

An output transformer 111 has a primary 112 with a center tap 113. The fifteen volt negative potential applied at terminal 110 also is connected to the center tap 113 by a lead 114. The output transformer has a secondary winding 115 connected to two output terminals 116 and 117.

The output of amplifier stage 93 is connected to a power switch stage 121. The power switch stage 121 consists of two parallel-connected power transistors 122 and 123 and their associated circuitry connected to one side of the primary 112. A diode 124 is connected across the switch stage output to provide overload limiting.

The output of amplifier stage 103 is connected to a power switch stage 126. The power switch stage 126 consists of two power transistors 127 and 128 and their associated circuitry connected to the other side of the primary 112. A diode 129 is connected across the switch stage output to provide overload limiting.

As was previously stated, the output from the threshold selectors 81, 82 consists of only the upper portions of the triangular input wave forms. The switch stages are normally biased to non-conduction. Therefore, since there has been a phase inversion between the two threshold selectors 81, 82, prior to threshold selection, input signals will not be applied to the two twitch stages 121 and 126 simultaneously. The push-pull output stage consisting of the two switch stages 121 and 126 thus operates class C push-pull. The polarity of connection of the transformer primary winding 112 and secondary winding 115 is indicated by conventional dot notation.

Conduction of current by the switch 121 in response to the shaped pulse causes a positive pulse to be induced in the secondary winding 115 by current conduction through the upper half of the primary winding 112, inducing a positive pulse in the output transformer secondary 115. At this time the switch 126 remains open since no input signal is applied from amplifier 103 to this switch stage section.

When an input signal is applied to the switch 126 from the amplifier 103, a negative pulse is induced in the secondary winding 115 by current flow through the lower half of the primary winding 112, inducing a negative pulse in the output transformer secondary 115. At this time the switch 121 is open since no input signal is applied from the amplifier 93 to this switch stage section.

The output induced in the secondary winding 115, which is applied to the servomotor (not shown) through the output terminals 116 and 117, consists of power pulses of alternating polarity. These power pulses will have the same frequency as the frequency of the A.-C. carrier potential applied to the diode ring across the carrier input terminals 32 and 33. The phase of these power pulses with respect to the phase of the A.-C. potential applied across terminals 32 and 33 will be determined by the polarity of the D.-C. error signal applied at terminal 45 from the servo resolver. By using the phase of the A.-C. carrier potential applied across the carrier input terminals 32 and 33 as the phase of the voltage applied to the main field of a servomotor, the phase relationship of the output applied to the control field by terminals 116 and 117 will bear the proper relationship with the main field excitation to control the rotation of the servomotor.

Typical components for the circuit just described are as follows:

| | |
|---|---|
| Diodes 39, 39, 41, 42 | Type 1N95. |
| Diodes 124, 129 | Type 1N91. |
| Transformer 46 United Transformer Co. | #UTC 0–10. |
| Transformer 111 Consolidated Electrodynamics | #B–120400. |
| Transistors 61, 72, 73, 88, 89, 96, 106 | Type 2N414A. |
| Transistors 97, 107 | Type 2N383. |
| Transistors 98, 108 | Type 2N442. |
| Transistors 122, 123, 127, 128 | Type 2N174. |
| Resistors 65, 66 | 4700 ohms. |

I claim:

1. A power control system comprising a source of a control signal, a variable amplitude sawtooth wave generator connected to the control signal source, pulse generating means connected to the sawtooth wave generator output and operable in response to the positive and negative peak portions of sawtooth waves to generate pulses of a predetermined polarity, the width of which is related to the amplitude of the sawtooth wave, a source of electrical power, an output circuit, a switch consisting of first and second normally open sections connected in push-pull between the source of electrical power and the output circuit, and means for closing the first switch section in response to pulses from the pulse generating means generated by positive peaks and for closing the second switch section in response to pulses from the pulse generating means generated by negative peaks, in which the duration of closing of each switch section is related to the width of the associated pulse.

2. A power control system comprising a source of an A.-C. potential, a source of a control potential, modulation means connected to the source of A.-C. potential and the source of control potential for modulating the A.-C. potential by the control potential to produce a modulated A.-C. potential whose magnitude and phase are functions of the control potential, a normally non-conducting push-pull connected transistor switch having an input circuit and an output circuit, and means connected to the modulation means and the switch input circuit for initiating current conduction in the switch output circuit in response to the exceeding of a selected magnitude by the modulated A.-C. potential whereby both the duration and phase of the current flow in the output circuit are functions of the control potential.

3. A power control system comprising a source of an A.-C. potential, a source of a control potential, means connected to the source of A.-C. potential and the source of control potential for modulating the A.-C. potential by the control potential, phase inversion means having first and second output circuits with outputs of opposite phase, means for applying the modulated A.-C. potential to said phase inversion means, a normally non-conducting transistor switch having a first section and a second section connected together in push-pull with first and second input circuits connected to the respective sections and an output circuit, means connecting the output of the phase inversion means first output circuit to the first switch section input circuit for initiating current conduction in the first section of the switch, and means connecting the output of the phase inversion means second output circuit to the second switch input circuit for initiating current conduction in the second section of the switch.

4. A system as described in claim 3 in which each means connecting a phase inversion means output circuit to a switch input circuit includes a threshold selector operable to initiate current conduction in the section of the switch associated therewith when the phase inversion means output associated therewith exceeds a selected magnitude in a predetermined polarity.

5. A power control system comprising a source of an A.-C. potential, a source of a control potential, means connected to the source of A.-C. potential and the source of control potential for modulating the A.-C. potential by the control potential, phase inversion means having an input circuit and first and second output circuits whose outputs are opposite in phase, means for applying the modulated A.-C. potential to said phase inversion means, first and second normally non-conducting threshold selectors, each having an input circuit and an output circuit and operable to conduct current in response to the application to the respective input circuits thereof of a potential exceeding a selected magnitude in a predetermined polarity, means connecting the phase inversion means first output circuit to the first threshold selector input circuit, means connecting the phase inversion means second output circuit to the second threshold selector input circuit, a normally non-conducting transistor switch consisting of a first section and a second section connected together in push-pull and having first and second input circuits connected to the respective switch sections and an output circuit, means connecting the first threshold selector output circuit to the first switch section input circuit so as to initiate current conduction in the first switch section in response to current conduction by the first threshold selector, and means connecting the second threshold selector output circuit to the second switch section input circuit so as to initiate current conduction in the second switch section in response to current conduction by the second threshold selector.

6. A system as described in claim 5 in which each means connecting a threshold selector output to a switch input includes amplifying means operable to apply a saturating signal to the respective switch input.

7. A system as described in claim 5 in which the means for applying the modulated alternating current voltage to the phase inversion means includes an integrating circuit operable to triangularly shape the input applied to the phase inversion means.

8. A power control system comprising a source of an A.-C. potential, a source of a control potential, means connected to the source of A.-C. potential and the source of control potential for modulating the A.-C. potential by the control potential, first shaping means for triangularly shaping the modulated A.-C. potential, phase inversion means having an input circuit connected to the shaping means and first and second output circuits whose outputs are opposite in phase, first and second normally non-conducting threshold selectors each having an input circuit and an output circuit and operable in response to the application to the input circuit of a voltage of a predetermined polarity exceeding a selected magnitude to conduct current, means connecting the phase inversion means first output circuit to the first threshold selector input circuit, means connecting the phase inversion means second output circuit to the second threshold selector input circuit, second shaping means operable to rectangularly shape the output of the first threshold selector, third shaping means operable to rectangularly shape the output of the second threshold selector, a normally non-conducting transistor switch having a first section and a second section connected together in push-pull with first and second input circuits connected to the respective sections thereof and an output circuit, means connecting the second shaping means to the switch first input circuit, and means connecting the third shaping means to the switch second input circuit.

References Cited in the file of this patent
UNITED STATES PATENTS

| | | | |
|---|---|---|---|
| Re. 24,678 | Pinckaers | Aug. 11, | 1959 |
| 2,226,459 | Bingley | Dec. 24, | 1940 |
| 2,426,225 | Krause | Aug. 26, | 1947 |
| 2,561,772 | Attwood | July 24, | 1951 |
| 2,767,330 | Marshall | Oct. 16, | 1956 |
| 2,779,869 | Gerks | Jan. 29, | 1957 |
| 2,842,664 | Martin | July 8, | 1958 |
| 2,850,236 | Schaefer et al. | Sept. 2, | 1958 |
| 2,881,312 | Resseler | Apr. 7, | 1959 |
| 2,891,726 | Decker et al. | June 23, | 1959 |
| 2,892,939 | Ule | June 30, | 1959 |

OTHER REFERENCES

Shea: "Principals of Transistor Circuits," John Wiley & Sons, 1953, page 153.

UNITED STATES PATENT OFFICE

CERTIFICATE OF CORRECTION

Patent No. 3,095,508 June 25, 1963

Herbert Karsh

It is hereby certified that error appears in the above numbered patent requiring correction and that the said Letters Patent should read as corrected below.

Column 1, line 35, for "fo" read -- of --; column 5, line 7, for "twitch" read -- switch --; line 48, for "Diodes 39," read -- Diodes 38, --.

Signed and sealed this 7th day of January 1964.

(SEAL)
Attest:
ERNEST W. SWIDER

Attesting Officer

EDWIN L. REYNOLDS

Acting Commissioner of Patents